Nov. 24, 1925.
P. HANSEN
OCCUPANT PROPELLED VEHICLE
Filed Dec. 27, 1924    3 Sheets-Sheet 1
1,562,553
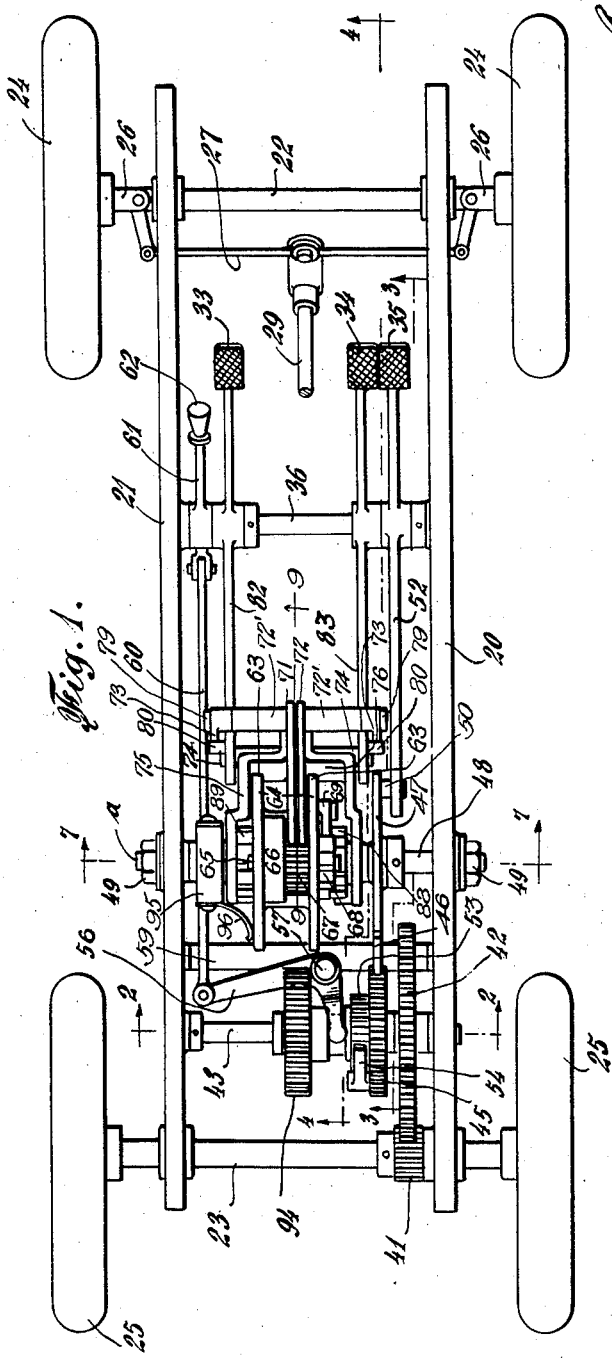
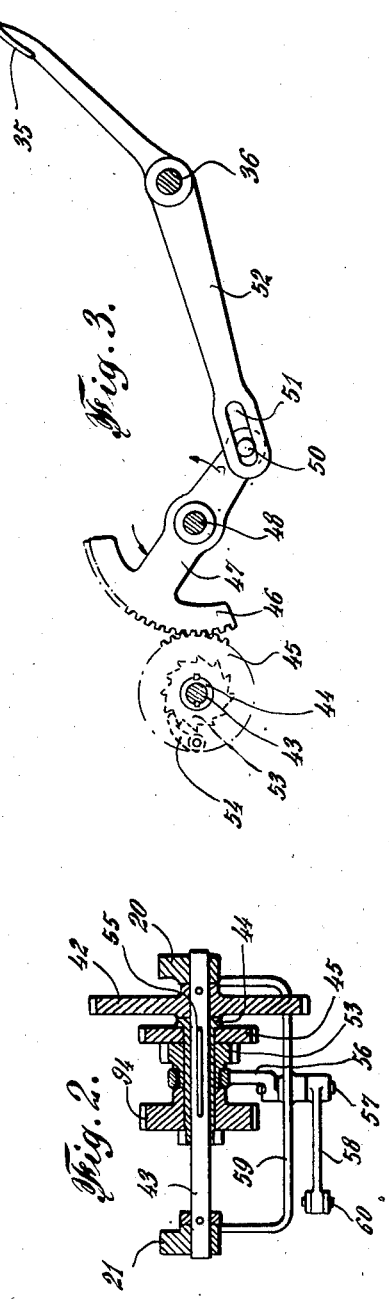
INVENTOR
Peter Hansen,
BY
ATTORNEY

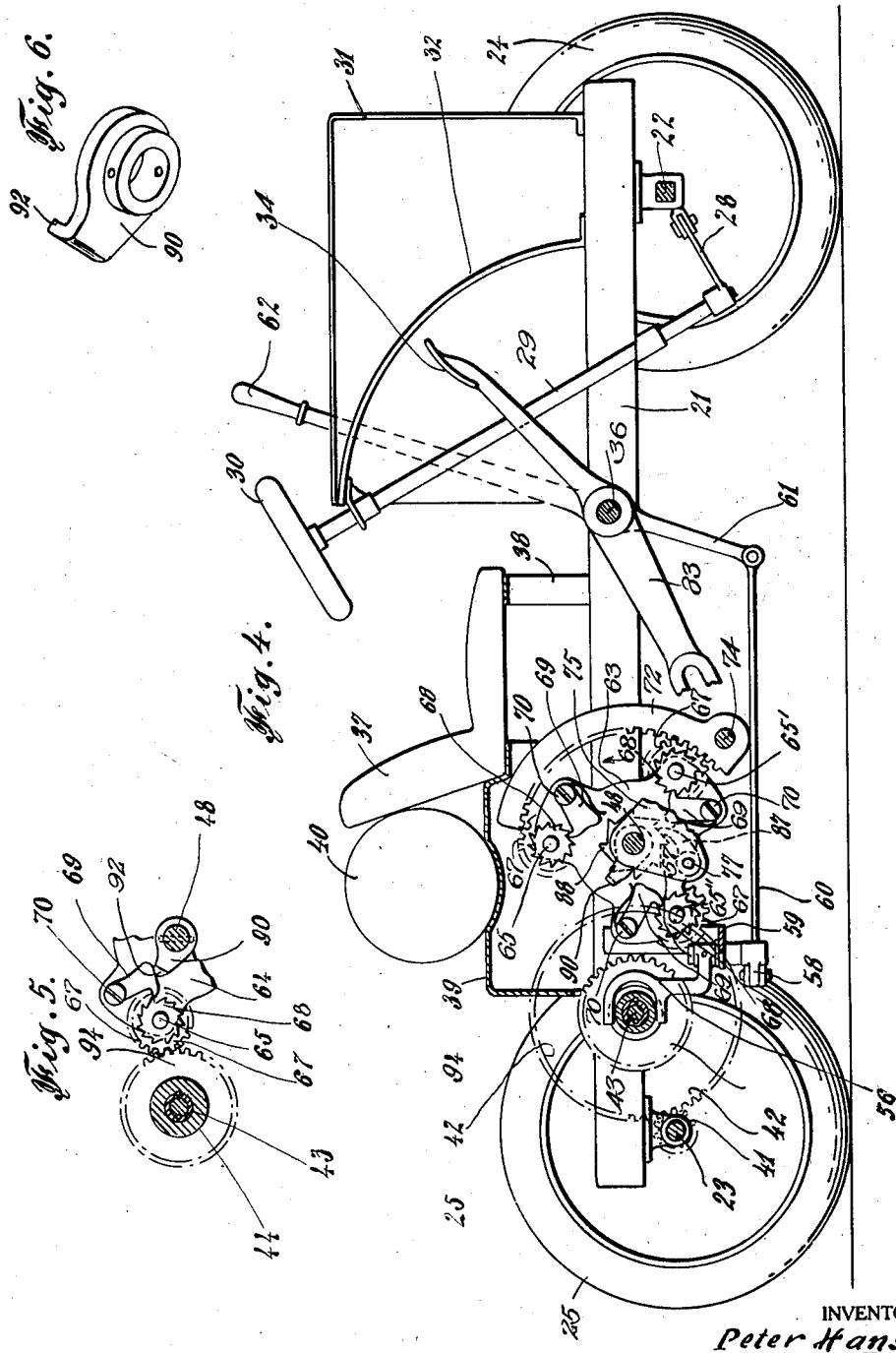

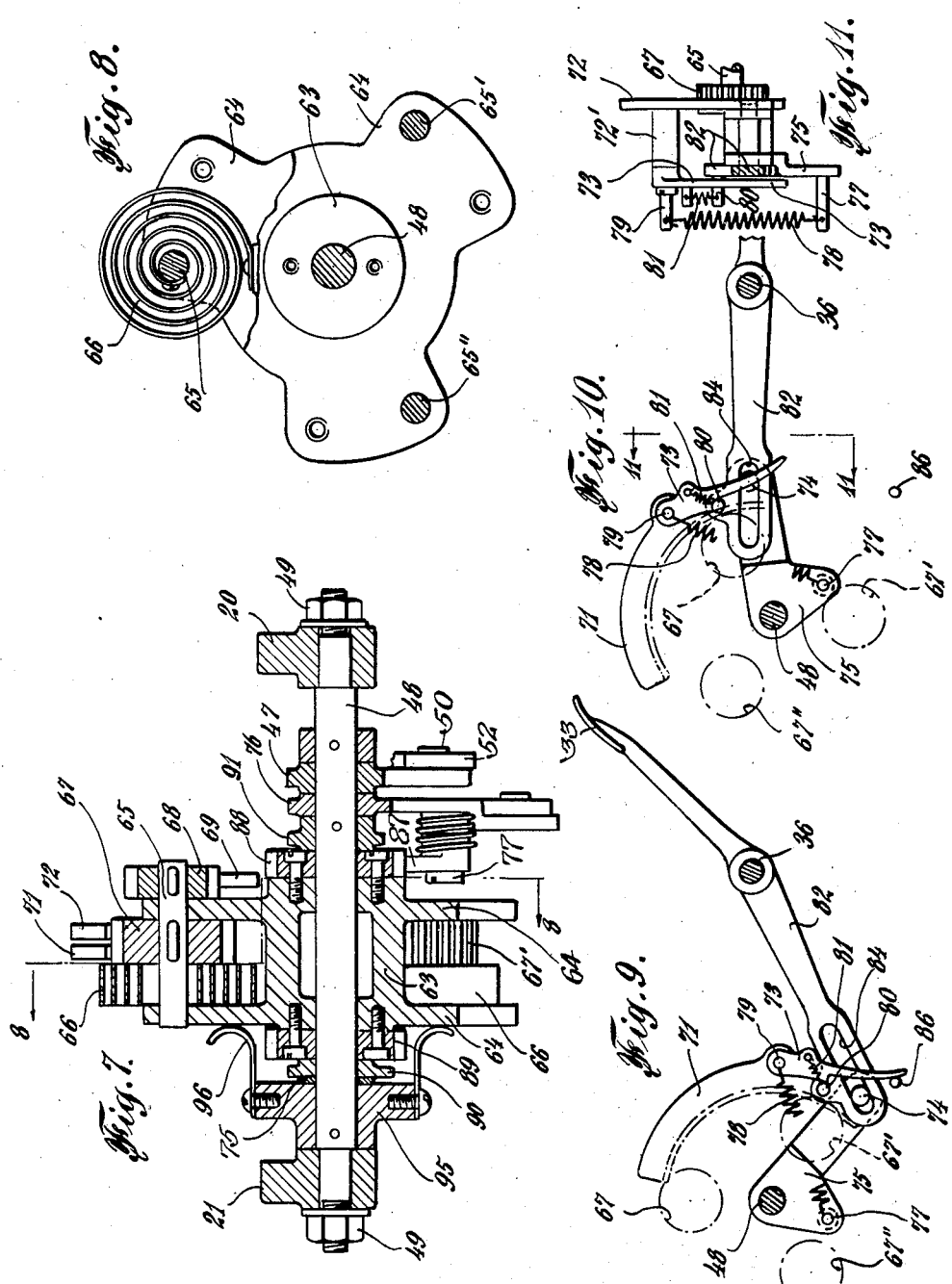

Patented Nov. 24, 1925.

1,562,553

UNITED STATES PATENT OFFICE.

PETER HANSEN, OF NEW YORK, N. Y.

OCCUPANT-PROPELLED VEHICLE.

Application filed December 27, 1924. Serial No. 758,348.

*To all whom it may concern:*

Be it known that I, PETER HANSEN, a citizen of Germany, residing at New York, in the county of New York and State of New York, have invented certain new and useful Improvements in Occupant-Propelled Vehicles, of which the following is a specification.

This invention relates to vehicles capable of being propelled by the occupant, and has as one of its features the provision of a vehicle resembling an automobile in appearance, and like it being provided with steering means, a steering seat and like other appurtenances, the vehicle being particularly adapted for the use of children.

A further feature is in the provision of a novel and highly efficient pedally actuated driving means easy to operate and unusually effective for propulsive purposes.

These and other minor objects which will later become manifest, are accomplished by the novel construction, arrangement and combination of parts hereinafter described and shown in the accompanying drawings, forming a part hereof, and in which:—

Figure 1 is a top plan view of an embodiment of the invention, the chassis frame being cleared of its superstructures.

Figure 2 is a transverse sectional view taken on line 2—2 of Figure 1.

Figure 3 is a longitudinal sectional view of one of the pedally actuated driving means, the section being taken on line 3—3 of Figure 1.

Figure 4 is a partial side elevational, partial sectional view, of a complete assembly of the vehicle, the section being taken on line 4—4 of Figure 1.

Figure 5 is a fragmentary longitudinal sectional view, showing one of the auxiliary drive devices as in engagement, the section being taken in a plane parallel to line 4—4 but at a point nearer the center of the vehicle.

Figure 6 is a detail perspective view of a detail of construction.

Figure 7 is an enlarged transverse sectional view taken on line 7—7 of Figure 1.

Figure 8 is a similarly enlarged sectional view taken substantially on line 8—8 of Figure 7.

Figure 9 is a longitudinal sectional view of another of the pedal actuating devices shown in a raised position, ready for operation.

Figure 10 is a similar view of the same shown in a lowered position, as after being depressed.

Figure 11 is a partial transverse sectional and end view of the same, the section being taken on line 11—11 of Fig. 10.

Referring more in detail to the drawings, the numerals 20 and 21 designate the right and left hand members respectively of the chassis frame, the same being on the front and rear axles 22 and 23 mounted respectively in the front wheels 24 and rear wheels 25, the front wheels having the usual knuckle-joint connections 26 connected by the rod 27 to be actuated by a lever 28 attached to a steering post 29 controlled by a hand wheel 30, as best seen in Figures 1 and 4.

The steering post 29 is guided by bearings attached to a casing 31, representing a conventional motor casing and having a curved shield plate 32 below which the pedals 33, 34 and 35 are disposed.

These pedals are formed on levers having hubs all of which are pivoted on a shaft 36 between fixed collars, the shaft being carried by the frame bars 20 and 21 at a point in advance of the seat 37 resting at the front on legs 38 and at the rear on a casing 39 over the driving mechanism and supporting a cylinder 40 representing a gasoline reservoir.

Fixed on the rear axle 23 is a spur pinion 41 in mesh with a gear 42 pinned by its hub to a shaft 43 journalled in the chassis frame bars 20 and 21. A sleeve 44 is slidably keyed on the shaft 43 and rotatable on the sleeve, adjacent the gear 42, is another gear 45 in engagement with a gear segment 46 carried at one end of a lever 47 pivoted on a shouldered shaft 48, which, like the other, is supported in the frame bars 20 and 21 and clamped by the nuts 49.

At the opposite end of the lever 47 is a pin 50 movable in a slot 51 in the rearwardly extending portion of a lever 52, carrying the pedal 35 and fulcrumed on the shaft 36, as before stated.

Keyed to the sleeve 44 alongside the gear 45 is a ratchet wheel 53, its teeth being engaged by a pawl 54 pivoted on the side of the gear 45, so that when the pedal 35 is depressed the gear 45 will turn, causing the pawl to engage with the teeth of the ratchet, conveying motion to the sleeve, shaft 43 and driving gear 42, thus causing the axle and wheels to rotate in contra-clockwise direction and the vehicle to move rearwardly.

The sleeve 44 and gears carried by it may be moved into disengaging position relative to the key 55, on the shaft 43, by a forked bell-crank lever 56 pivoted on a stud 57, set in a looped bracket 59, the other arm 58 of the lever extending laterally towards the frame bar 21 and being pivotally connected with a link 60 extending towards the front and pivoted to the lower end of a lever 61 fulcrumed on the shaft 36 and provided with a handle 62 easily accessible from the seat 37.

Rotatably mounted on the shaft 48 is a double trilobed spider 63 having between its spaced sides 64, near the peripheries of the lobes, spindles 65, 65' and 65'' to which are secured the inner ends of flat spiral springs 66, their outer ends being fixed to the central portion 63 of the spider.

Adjacent the springs are pinions 67, 67' and 67'' keyed to the spindles, the extending ends of which have keyed to them ratchet wheels 68 engaged by spring pressed pawls 69 pivoted on shouldered screws 70 engaged in holes in the corners of the lobes opposite the spindles.

The pinions 67, 67' and 67'' are engageable with curved segments 71 and 72 having teeth on their inner concave faces and provided with projecting hubs 72' carrying detent arms 73.

The lowermost ends of the segments 71 and 72 are pivotally secured on pins 74 fixed in the outer ends of offset lever arms 75 and 76, fulcrumed on the shaft 48 upon opposite sides of the spider and carrying pins 77 to which are attached one of the ends of coiled tension springs 78, their other ends engaging pins 79 on which the detent arms 73 are pivoted, the action of these springs being to draw the segments into operative engagement with the several pinions 67, 67' and 67''.

The detent arms 73 may be engaged with pins 80 against which they are drawn by the tension springs 81, the pins 80 being fixed in a part of levers 82 and 83 pivoted on the shaft 36 and carrying the pedals 33 and 34 respectively, the rear portions of these levers having elongated slots 84 in which the pins 74 operate.

Pins 86 fixed in stationary portions of the casing serve to make contact with the extremities of the detent arms to disengage therefrom the pins 80, permitting the segments to become disengaged from the pinions at the ends of their downward movement.

The pins 77 extend through the offset levers 75 and pivoted on them are pawls 87 engaging ratchet wheels 88 and 89 rotatable on the shaft 48 and fixed to the sides 64 of the spider.

A pair of dogs 90 and 91 pinned to the shaft 48 have bent outstanding ends 92 adapted to contact with the pawls 69 and release them from the ratchets 68 at such times as the pinions 67, 67' and 67'' engage the gear 94, at which time the energy stored in the springs 66, is translated to the gear 94, which being fixed on the sleeve 44, keyed to the shaft 43, is transmitted to the rear wheels in clock-wise direction to advance the vehicle.

In order to avoid too free movement of the spider 63, a collar 95 is pinned to the shaft 48, having on its periphery a plurality of curved flat spring arms 96, their outer bowed portions pressing against the side of the spider as shown in Fig. 7.

From the foregoing it is seen that the vehicle is directionally controlled by the hand wheel 30 in a well known manner.

The action of the pedals 33 and 34, when depressed in alternate relation, energizes the springs 66 eventually to be transferred in propelling the vehicle in a forward direction and the pedal 35 will cause the vehicle to move backward by direct transmission of force applied to it.

It will also be noted that the driving transmission, either forward or back, may be readily disconnected by the lever 62, thus permitting the vehicle to coast or descend an elevation without recourse to the pedals.

Although the foregoing explains with considerable detail the construction and operation of the vehicle in accordance with a preferred embodiment, it will be understood that the same is subject to modifications and changes within the spirit and scope of the appended claims.

Having thus described my invention, what I claim, is:—

1. An occupant propelled vehicle comprising in combination with a chassis frame having front and rear wheels, of a steering means, alternately operable pedals to move the vehicle forward, a single pedal to move the vehicle backward, intermediate gear trains to transmit the movement of the pedals to the rear wheel axle, and means for disengaging the gear trains therefrom.

2. An occupant propelled vehicle comprising in combination with a chassis frame having front and rear wheels, of a steering means, a plurality of shafts mounted transversely in said frame, a pair of alternately operable pedally actuated levers pivoted on one of the shafts, a single lever also pivoted on the same shaft, a pinion on the axle of the rear wheels, a gear meshing therewith, a segment meshed with said gear, operative connections between the single lever and said segment whereby the vehicle may be propelled rearwardly, and means actuated by the pair of pedal levers to advance the vehicle.

3. An occupant propelled vehicle comprising in combination with a chassis frame having front and rear wheels, of a steering means, a plurality of shafts mounted transversely in said frame, a pair of alternately operable pedally actuated levers pivoted on one of the shafts, a spider rotatable intermittently on another of said shafts, spring actuated gears carried by said spider, the spring being tensioned by said levers, a pinion on the rear wheel axle, a gear mounted on another shaft to engage said pinion, a drive gear on the last named shaft to mesh with the spring actuated gears in sequence, means to prevent a reverse movement of said gears, and means for disconnecting said gears from the driving pinion.

4. An occupant propelled vehicle comprising in combination with a chassis frame having front and rear wheels, of a steering means, a plurality of shafts mounted transversely in said frame, a pair of alternately operable pedally actuated levers pivoted on one of the shafts, a spider rotatable intermittently on another of said shafts, spring actuated gears carried by said spider, the spring being tensioned by said levers, a pinion on the rear axle wheel, a gear mounted on another shaft to engage said pinion, a drive gear on the last named shaft to mesh with the spring actuated gears in sequence, means to prevent a reverse movement of said gears, means to shift the gears on the last named shaft, and pedally actuated means to cause the vehicle to move rearwardly.

5. A vehicle having occupant actuated pedal levers to move the vehicle either forward or backward, a lever to disengage the driving means, a steering wheel, and a seat for the occupant to render the control and drive means accessible.

In witness whereof I have affixed my signature.

PETER HANSEN.